UNITED STATES PATENT OFFICE.

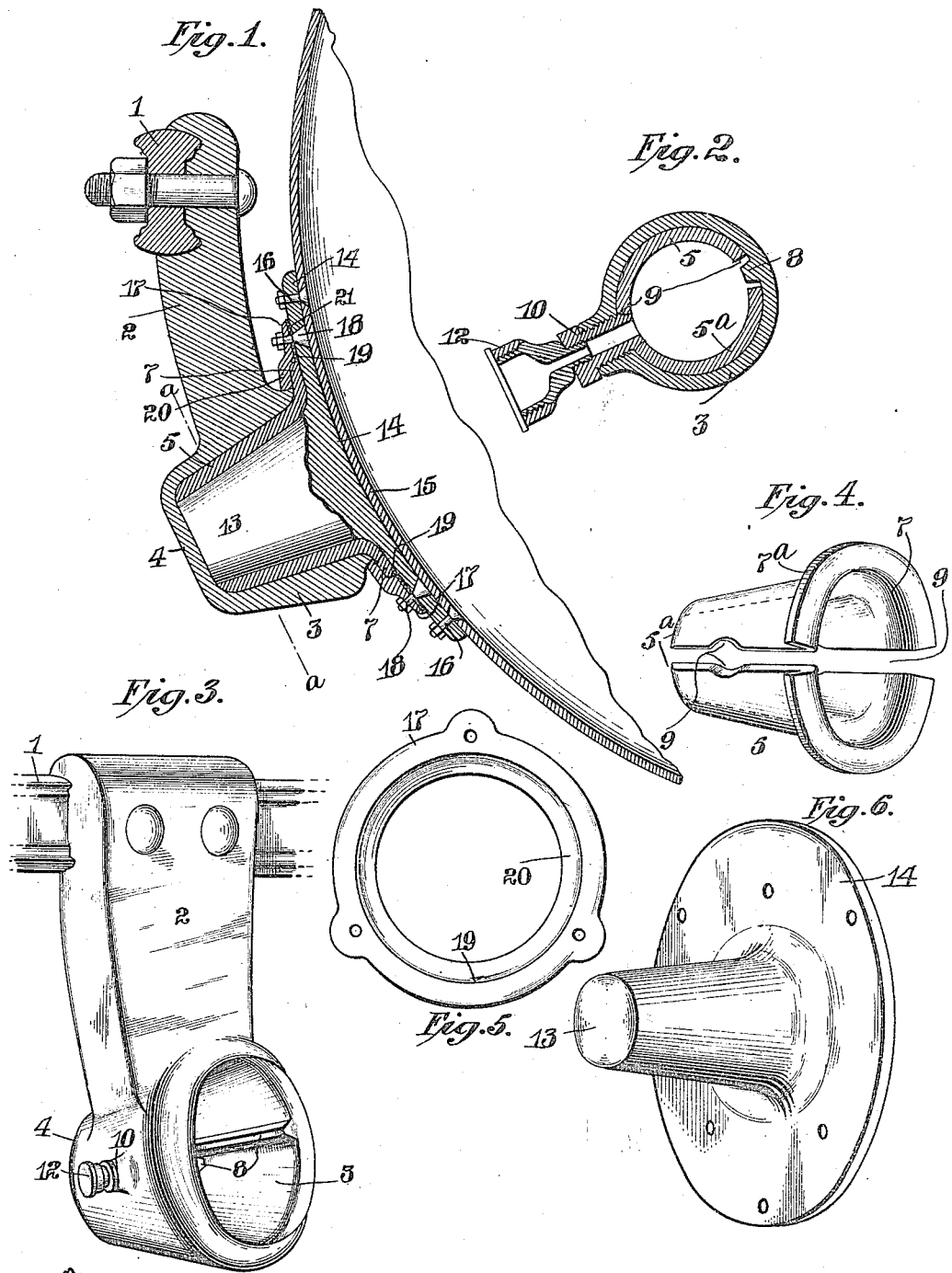

HARRY S. DICKINSON, OF MOLINE, ILLINOIS, ASSIGNOR TO MOLINE PLOW COMPANY, A CORPORATION OF ILLINOIS.

DISK-BEARING.

1,234,533.

Specification of Letters Patent.

Patented July 24, 1917.

Application filed September 10, 1915. Serial No. 49,873.

*To all whom it may concern:*

Be it known that I, HARRY S. DICKINSON, a citizen of the United States, residing at Moline, in the county of Rock Island and State of Illinois, have invented certain new and useful Improvements in Disk-Bearings, of which the following is a specification, reference being had therein to the accompanying drawing.

This invention relates to bearings for rotary disks employed in agricultural implements, more particularly in disk plows, the aim of the invention being to provide a bearing which will give the disk effective rotary support; the parts of which may be readily and conveniently assembled or disassembled; in which the escape of lubricant from the bearing parts and the entrance of dust or dirt thereto will be prevented; in which the parts may be adjusted to compensate for wear; and in which the wear will be received by parts inexpensive to renew. With these and other objects in view, my invention consists in the features of construction and arrangement of parts illustrated in the accompanying drawings and described in the specification to follow, and the novel parts of which will be set forth in the appended claims.

In the accompanying drawings:

Figure 1 is a sectional elevation showing my improved disk bearing applied to a plow beam, the section being taken axially through the bearing.

Fig. 2 is a transverse section on the line a—a of Fig. 1.

Fig. 3 is a perspective view of the socketed supporting arm of the bearing.

Fig. 4 is a perspective view of the removable bearing lining for the socket.

Fig. 5 is an elevation of the retaining ring for retaining the disk spindle within the bearing lining.

Fig. 6 is a perspective view of the disk spindle removed from the disk.

Referring to the drawings:

Referring more particularly to Fig. 1, 1 represents a plow beam having fixed thereto a depending supporting arm 2 provided in its lower end at one side with a side socket 3 closed at one end as at 4, and preferably sloping outwardly toward its open end. Seated in the socket is a removable bearing lining 5 preferably of chilled steel, and in the form of two semicircular sections 5ª. The ends of the sections extend beyond the socket and are extended outwardly laterally so as to conjointly form an annular outwardly extending flange 7, the outer edge of which forms an annular shoulder 7ª, the purpose of which will presently appear. The socket in the bearing arm is provided at diametrically opposite points with inwardly extending axial ribs 8, which when the sections of the lining are seated in the socket, will extend between the adjacent edges of said sections, whereby the bearing lining as a whole will be prevented from shifting circumferentially within the socket. At one side the adjacent edges of the sections of the lining are formed with opposing cavities 9 which conjointly form a recess. 10 represents a radially extending oiler stud which is screwed into a radial opening in the wall of the socket, and the inner end of which engages in opposing cavities 9 in the adjacent edges of the lining sections, whereby the said sections will be prevented by the stud from endwise movement within the recess and will be retained therein. The oiler stud contains a longitudinal feed opening for the passage of the lubricant to the interior of the lining, and it may be provided with an oil cup 12 for the supply of oil to the feed opening. Rotatable within the bearing lining is a disk spindle 13 which extends outwardly at its base in the form of a plate 14, which is seated against and firmly secured to the convex face of a disk 15 by means of bolts 16, the surface of the plate adjacent the spindle, bearing flatly against the outer face of the annular flange 7 on the bearing lining as clearly shown in Fig. 1. The spindle is retained in the bearing lining by means of a retaining ring 17 connected fixedly by bolts 18 to the base plate 14 of the spindle. The retaining ring is provided with an annular shoulder 19 which abuts closely against the annular shoulder 7ª on the bearing lining, and is provided also with an overhanging flange 20 which bears against the face of the annular flange 7 opposite that face against which the base plate 14 bears, a packing 21 being applied between the retaining ring and the base plate so as to form a tight joint at that point. As a result of the construction described the annular flange on the lining is embraced closely but movably between the base of the spindle and the retaining ring, and the annular shoulder 19 on the retaining ring bears tightly against the annular shoulder 7ª on the lining. The parts thus arranged and related constitute a close joint between the disk spindle and outer end of the bearing lining, which while permitting of a free rotation of the disk, will effectually prevent the entrance of dust to the bearing parts, and will also effectually prevent the escape of lubricant therefrom.

In the assemblage of the parts, the retaining ring is first slipped over the open end of the socket, and the sections of the bearing lining are then seated in the socket with their adjacent edges extending along the sides of the axial ribs. The oiler stud is now screwed in the opening in the wall of the socket and its inner end engaged in the opposing cavities in the adjacent edges of the lining sections. This will retain the bearing lining within the socket against endwise movement, the lining being retained against circumferential movement by the axial ribs. The disk spindle is then entered in the lining and secured to the retaining ring by the bolts 18, and finally the disk is applied to the base of the spindle and firmly fastened thereto by the bolts 16. With the parts in this position the disk spindle with the disk attached, may rotate freely within the bearing lining and will be retained therein by the retaining ring, while the escape of the lubricant from, and the entrance of dust or dirt to the bearing surfaces will be effectually prevented by the interfitting of the annular flange on the lining, between the base of the spindle and retaining ring. The parts may be readily disassembled for repairs, replacement, or for other purposes, by first loosening up the oiler stud until its inner end is withdrawn a sufficient distance to allow the sections of the lining to be withdrawn endwise from the recess. In this way the disk may be quickly dismounted for transportation and shipping purposes or for other purposes.

In the event of wear between the spindle and bearing lining, such wear may be compensated for by "shimming" up the lining sections by the introduction of a thickness or thicknesses of paper or cardboard between the outer surface of the sections and the inner surface of the socket.

As a result of the construction described, the disk is rotatably supported in its bearing without the use of connecting devices extending axially through the spindle and the end of the socket as commonly employed. Consequently the recess in the support may be entirely closed at one end, which will prevent the escape of the lubricant at this point.

Furthermore, by the employment of the sectional bearing lining, the wear is received by parts which may be renewed at slight expense; and the necessity of chilling the interior of the socket at comparatively great expense, which would be necessary if the spindle received a bearing direct from the wall of the socket, is avoided. Furthermore, provision is made for taking up and compensating for wear, so that the life of the bearing is greatly prolonged.

In the accompanying drawings and foregoing description I have set forth my invention in the form and construction which I prefer to adopt and which in practice has been found to answer to a satisfactory degree the ends and advantages to be attained. It will be manifest to the skilled mechanic however, that various changes may be made without departing from the limits of my invention, provided the operation will be substantially as indicated above. Further it will be understood that the invention is not limited to any particular form or construction of the parts except as hereinafter specified in the claims.

Having thus described my invention, what I claim is:

1. In combination with a support provided with a socket, a removable bearing-lining therein, an oiler stud sustained by the support and interlocked with the lining to retain the same in the socket, a disk spindle rotatable in the lining, and means for retaining the spindle therein.

2. In combination with a support provided with a socket, a removable bearing-lining therein consisting of two sections, a stud sustained by the support and engaging between the sections of the lining to retain the same in the socket, a disk spindle rotatable in the lining, and means connecting the spindle rotatably with the lining for retaining the spindle therein.

3. In combination with a support provided with a socket, a removable sectional bearing-lining therein provided with recessed edges, a stud sustained by the support and engaging in the recesses in the sections, a disk spindle rotatable in the lining, and means for retaining the spindle therein.

4. In combination with a support provided with a socket having an axially extending rib, a removable sectional lining in said socket, the said rib extending between the adjacent edges of the sections of the lining to prevent circumferential movement thereof, means for retaining the lining in the socket, a disk spindle rotatable in the lining, and means for confining the spindle therein.

5. In combination with a support provided with a socket having two axially extending ribs, a removable sectional bearing-lining in said socket, said ribs extending between the adjacent edges of the sections of said lining to prevent circumferential movement thereof, means for retaining the sections in the socket, a disk spindle rotatable in the lining, and means for retaining the spindle therein.

6. In combination with a support provided with a socket having an axially extending rib at one side, a removable sectional bearing-lining in the socket, the said rib engaging between the adjacent edges of the sections of the lining at one side of the latter to prevent circumferential movement thereof, a stud sustained by the support and engaging at its end between the adjacent edges of the sections of the lining at the opposite side of the latter to retain the same against endwise movement in the socket, a disk spindle rotatable in the lining, and means for retaining the spindle therein.

7. In combination with a support provided with a socket having a closed inner end, a removable bearing lining open at both ends and seated in said socket, the inner end of the bearing lining being covered by the closed end of the socket to prevent the escape of lubricant, means for retaining the lining in the socket against circumferential and endwise movement, and a disk spindle rotatable in the bearing lining.

8. In combination with a support provided with a socket having a closed inner end, a bearing lining consisting of two semicircular sections seated in said socket, said bearing lining being closed at its inner end by the closed end of the socket to prevent the escape of lubricant, means for releasably retaining the lining sections in the socket against circumferential and endwise movement, and a disk spindle rotatable in said bearing lining.

9. In combination with a support provided with a socket closed at one end, a removable bearing-lining in said socket, an oiler stud sustained by the support with its inner end engaged with the lining to introduce lubricant within the same and to prevent circumferential movement thereof, a disk spindle mounted in the lining, and means for retaining the same therein, said means acting to prevent the entrance of dust to, and the escape of oil from the bearing surfaces.

10. In combination with a support provided with a socket closed at one end, a removable bearing-lining in said socket, an oiler stud sustained by the support with its inner end engaged with the lining to introduce lubricant within the same and to prevent circumferential and endwise movement thereof, a disk spindle mounted in the lining, and means for retaining the spindle therein, said means acting to prevent the entrance of dust into and the escape of oil from the bearing surfaces.

11. In combination with a support provided with a socket, a removable bearing lining therein, means for retaining the lining against circumferential and endwise movements in the socket, said lining being provided on one end with an outwardly extending annular flange, a disk spindle rotatable in the lining, and a retaining ring carried by the spindle and provided with an annular shoulder and with an overhanging flange, the said shoulder bearing directly against the end of the annular flange on the lining to prevent the escape of lubricant, and the overhanging flange on the ring bearing against the face of the flange on the lining.

In testimony whereof, I have affixed my signature.

HARRY S. DICKINSON.

Copies of this patent may be obtained for five cents each, by addressing the "Commissioner of Patents, Washington, D. C."